US012746649B2

(12) United States Patent
Komasa

(10) Patent No.: US 12,746,649 B2
(45) Date of Patent: Sep. 29, 2026

(54) V-CLAMP TOOL APPARATUS AND METHOD OF USE

(71) Applicant: Christopher Ryan Komasa, San Diego, CA (US)

(72) Inventor: Christopher Ryan Komasa, San Diego, CA (US)

( * ) Notice: Subject to any disclaimer, the term of this patent is extended or adjusted under 35 U.S.C. 154(b) by 283 days.

(21) Appl. No.: 16/849,948

(22) Filed: Apr. 15, 2020

(65) Prior Publication Data

US 2020/0376638 A1 Dec. 3, 2020

Related U.S. Application Data

(60) Provisional application No. 62/834,921, filed on Apr. 16, 2019.

(51) Int. Cl.
*B25B 27/16* (2006.01)
*B25B 27/14* (2006.01)
*F16L 23/00* (2006.01)

(52) U.S. Cl.
CPC .............. *B25B 27/16* (2013.01); *B25B 27/14* (2013.01); *F16L 23/003* (2013.01)

(58) Field of Classification Search
CPC ......... B25B 27/16; B25B 27/14; B25B 27/20; B25B 27/205; B25B 27/143; B25B 25/005; B25B 7/12; F16L 33/03; F16L 23/003; Y10T 29/53783; Y10T 29/53657; Y10T 29/539
USPC ............................ 81/485, 9.3, 302, 112, 486
See application file for complete search history.

(56) References Cited

U.S. PATENT DOCUMENTS

| | | | | |
|---|---|---|---|---|
| 6,276,236 | B1 * | 8/2001 | Wu | B25B 7/14 81/347 |
| 6,370,985 | B1 * | 4/2002 | Wu | B25B 25/005 81/324 |
| 6,634,258 | B2 * | 10/2003 | Pool | B25B 25/005 81/487 |
| 7,104,162 | B1 * | 9/2006 | Wu | B25B 7/12 81/3.36 |
| 9,163,657 | B2 * | 10/2015 | Gillet | B25B 25/005 |
| 10,632,598 | B2 * | 4/2020 | Wu | B25B 9/00 |
| 10,688,636 | B2 * | 6/2020 | Wu | B25B 25/005 |
| 2007/0227309 | A1 * | 10/2007 | Teeters | B25B 15/02 81/9.3 |
| 2013/0086782 | A1 * | 4/2013 | Dewell | B25B 27/10 29/237 |
| 2019/0184531 | A1 * | 6/2019 | Wang | B25B 25/005 |
| 2019/0360512 | A1 * | 11/2019 | De Campos | B25B 25/005 |

* cited by examiner

*Primary Examiner* — Robert F Neibaur
(74) *Attorney, Agent, or Firm* — Steven C. Tietsworth, Esq.

(57) ABSTRACT

Tools for use in installing and removing V-clamps are disclosed. One embodiment of a V-clamp tool includes a spreader mechanism, an actuator cable, and a plier element mechanically coupled so as to expand or contract hooks shaped to engage corresponding V-clamp brackets to widen or shrink the V-clamp opening for installation or removal.

26 Claims, 14 Drawing Sheets

*Example Embodiment of a Spreader Mechanism in Closed Position*

*Example V-Clamp (PRIOR ART)*

Detail of V-Clamp Clamping Adjustment Mechanism (PRIOR ART)

*Detail of V-Clamp Locking Action PRIOR ART)*

*Side View Detail of V-Clamp Clamping Adjustment Mechanism*
*(PRIOR ART)*

*Top Down View Detail of V-Clamp Clamping Adjustment Mechanism*
*(PRIOR ART)*

*Example Embodiment of a V-Clamp Installation Tool*

*Example Embodiment of a Spreader Mechanism in Closed Position*

*Details of Actuator Cable Distal End Coupling to Spreader Mechanism*

*Details of Actuator Cable Distal End Coupling to Actuator Mechanism*

*Example Embodiment of a Spreader Mechanism In Opened Position*

*Example Embodiment of a Spreader Mechanism on V-Clamp In Released Position*

*Example Embodiment of a Spreader Mechanism on V-Clamp In Opened Position*

*Example Embodiment of Actuator In V-Clamp Held Open Position*

*Example Embodiment of Actuator In V-Clamp Closed Position*

V-CLAMP TOOL APPARATUS AND METHOD OF USE

FIELD

This disclosure relates generally to installation of clamps to secure two separate pipe sections or other parts. More specifically, but not exclusively, the disclosure relates to a tool for facilitating installation of V-clamps to join sections of pipe or other tubular components.

BACKGROUND

V-clamps, also known as "V Band" clamps, are well known coupling devices for securing two sections of flanged tubing together in a wide variety of vehicular and industrial applications. For example, piping systems for use with pumps, exhaust systems, filters, food and chemical processing, and various other applications use V-clamps to secure separate sections together.

FIG. 1 illustrates details of a typical V-clamp 100. V-clamp 100 includes a latch assembly 130 for tightening or loosening the clamp, typically about two flanged cylindrical sections of pipe, a band 102 that has two open ends (on either side of opening 103 as shown in FIG. 1) rather than a contiguous joined structure, and one or more coupling segments 106 to engage flanges on the ends of tubes or other elements to be joined. Tightening the band with the latch assembly, typically by turning a nut (e.g., nut 162), enlarges or contracts the diameter of the band 102 (and correspondingly increases or decreases the gap 103 respectively). The coupling segments 106 are optional but are typically includes. When used they serve to engage a flange or other structure of the pipe sections or other elements being joined by the clamp. There are many variations of the basic V-clamp design shown in FIG. 1, and these include other elements not specifically shown in FIG. 1. As such, the V-clamps shown herein are provided for purposes of illustration rather than limitation.

As noted above, opening and closing of a V-clamp such as V-clamp 100 is typically done by either loosening (for opening) or tightening (for closing) a nut or other threaded mechanism onto a bolt element of the latch assembly 130. For example, details of a typical latch assembly 130 are shown in FIG. 2A, with nut 162 used for loosening or tightening the V-clamp by being turned inward (for tightening) or outward (for loosening) on a threaded portion 173 of a bolt 170. For example, exemplary latch assembly 130 includes a bolt 170 with a head 171 at a proximal end, typically cylindrical and welded or otherwise formed or attached to the elongate proximal section of the bolt, and threads 173 on a distal end of bolt 170. The proximal end of the bolt 170 is restrained by a bracket 140 attached to or formed on one end of the band 102, and tightening the nut 162 onto the threads 173 pulls the distal end of the bolt 170 outward from a second bracket 150 on the other end of the band 102 to pull the two ends of band 102 together. Conversely, loosening nut 162 moves the distal end of the bolt 170 inward, providing slack in the band to allow for positioning the V-clamp on two pipe sections being joined together or releasing the two pipe sections upon disassembly.

In order to retain tension on the V-clamp when tightened, the head or proximal end of bolt 170, such as cylindrical head element 171 as shown, is retained within a correspondingly shaped and sized retaining element such as bracket 140, which in a typical V-clamp embodiment includes a base section 145, an upper bar section 142, a curved section 143, and a lower bar section 144. Bracket 140 is mechanically coupled to band 102 via a welded connection or other coupling connection or may be formed into the band. Bracket 140 encloses an inner volume 131 where the bolt head 171 is retained against the bracket, and bracket 140 may include an opening such as slot 132 or an alternate opening to allow the elongate section of the bolt 170 to pass through the bracket while allowing the bolt head to rotate about axis X when the nut is tightened or loosened. A similar bracket 150 is coupled or formed into the other end of band 102 to allow the bolt to slide through an opening while being tightened or loosened while blocking inward movement of the bolt 170 beyond a limit set by the position of nut 162.

For example, a locking pin assembly such as is shown in FIG. 2A includes the hollow tubular section 181 and retaining pin 182, or other similar or equivalent elements, to retain the bolt 170 to bracket 150, which may be made in a configuration similar to bracket 140. Bracket assembly 150 may include an upper bar section 152, curved section 153, and lower bar section 154 defining a corresponding open volume and slot to allow the bolt 170 to pass through. Retaining pin 182 may be positioned within bracket 150 similarly to bolt head 171 so as to rotate about a corresponding axis when the nut is tightened or loosened.

In use, V-clamps provide a squeezing and wedging action about two pipe sections and their associated flanges resulting from tightening of a nut such as nut 162 of FIG. 2A, or other similar or equivalent attachment mechanisms, onto a corresponding bolt, such as bolt 170. As the nut is tightened, the ends of the band 102 are drawn together resulting in the joint between opposite sides of the band 102 decreasing in size and squeezing associated flanges on tubing sections together. The nut 162 can be tightened to a desired torque to ensure sufficient sealing of a pipe joint and retention of pipe sections in a fixed, position until the nut is subsequently loosened. This squeezing action can provide a strong, leak-proof joint between the tubing sections, which can be further reinforced with gaskets or other sealing elements. V-clamps are useful for various types of pipe joints, such as sections of engine exhaust or other gas tubing, as well as various other pipe joining applications, as well as other joining applications.

FIG. 2B illustrates additional details of a V-clamp such as V-clamp 100. FIG. 2B shows only one end of the band and bracket 140 for clarity to illustrate how the V-clamp engages two flanged pipe sections for joining together. As shown in FIG. 2B, two flanged cylindrical pipe sections 210 and 220 are positioned with corresponding flanges 212 and 222 adjacent. Coupling segments 106 of the V-clamp engage the flanges 212 and 222. Bolt 170 is tightened at the end not shown with nut 162 (not shown) to pull the second end of the band (not shown) together. This both squeezes the pipe sections into alignment and, based on the shape of the flange, wedges the flanged sections tightly together.

Although some times of pipe joints are intended to be permanently installed, an advantage of joints using V-clamps such as V-clamp 100 is that they are well suited to applications where the joined tubular sections (or other elements that are coupled together) need to be assembled and removed frequently, as disassembly can be done through simply loosening the nut, and the tube sections or other elements can be tightly joined by tightening the nut.

However, a disadvantage of typical V-clamps such as the examples shown herein is that the band, such as band 102, is made of spring steel or other materials that are formed and shaped to be in a position close to that of the closed or tightened position when tension is removed by loosening the nut. For example, the V-clamp band ends may be in approximately the position shown in FIG. 1 when the nut 162 is removed. As such, the band needs to be pulled apart by a user during installation to stretch it over the flanges, and in some cases when removing the two pipes or separating the ends. The spring actuated return forces typically act to pull the band ends back together when they are pulled apart, so that a user needs to use their hands to hold the band ends apart during installation.

Put another way, typical V-clamps are normally formed so that the two ends of band 102 are close together, which can cause problems getting the V-clamp over and oriented onto the ends of the tubular sections, particularly when the clamp is being installed (which is often in tight spaces). During such installation, a mechanic often needs to pull the band apart from its normal position to get the ends of tubes or other elements to be joined together. Maneuvering two pipe ends as well as the V-clamp into place while pulling the band ends apart, particularly in tight spaces, can be very difficult, time consuming, and potentially damaging to fingers and hands.

Accordingly, there is a need in the art for improved apparatus for use in installing and removing V-clamps and other similar or equivalent attachment mechanisms.

SUMMARY

This disclosure relates generally to tools for facilitating installation or removal of V-clamps that join sections of pipe or other components.

For example, in one aspect the disclosure is directed to a V-clamp installation/removal tool. The tool may include, for example, a spreader mechanism. The spreader mechanism may include an elongate hollow outer support element having a proximal end and a distal end, the hollow outer support element defining an interior volume, a first spreader hook coupled to the outer support element at or near the proximal end of the outer support element, an elongate inner support element having a proximal and a distal end, the inner support element slidably positioned at least partially within the interior volume, a second spreader hook coupled to the inner support element at or near the proximal end of the inner support element, and a spring positioned between the outer support element and the inner support element within the interior volume. The tool may further include an actuator cable having a tubular outer element and an inner cable slidable within the tubular outer element. The tool may further include a plier element having a first handle mechanically fixed to a first jaw and first gripping element and a second handle mechanically fixed to a second jaw and second gripping element with the first handle and second handle pivotably coupled. The distal end of the actuator cable outer element may be mechanically coupled to the outer support element and the actuator cable inner cable is mechanically coupled to the inner support element. The proximal end of the actuator cable outer element may be mechanically coupled to one of the gripping elements and the proximal end of the actuator cable inner cable may be mechanically coupled to the other gripping element.

In another aspect, the disclosure is directed to a spreader mechanism for use in a V-clamp installation tool. The spreader element may include, for example, an elongate hollow outer support element having a proximal end and a distal end, the hollow outer support element defining an interior volume, a first spreader hook coupled to the outer support element at or near the proximal end of the outer support element, an elongate inner support element having a proximal and a distal end, the inner support element slidably positioned at least partially within the interior volume, a second spreader hook coupled to the inner support element at or near the proximal end of the inner support element, and a spring positioned between the outer support element and the inner support element within the interior volume.

In another aspect, the disclosure is directed to a spreader mechanism for use in a V-clamp installation tool. The spreader mechanism may include, for example, an elongate hollow rectangular tubular cross-sectional outer support element having a proximal end and a distal end, the hollow outer support element defining an interior volume, a first spreader hook coupled to the outer support element at or near the proximal end of the outer support element, the first spreader hook having a hook-shaped portion with a substantially circular cross sectional shape and a slot therein to position the first spreader hook about a V-clamp bolt, an elongate inner support element having a proximal and a distal end, the inner support element slidably positioned at least partially within the interior volume, a second spreader hook coupled to the inner support element at or near the proximal end of the inner support element, the second spreader hook having a hook-shaped portion with a substantially circular cross sectional shape and a slot therein to position the second spreader hook about the V-clamp bolt, and a spring positioned between the outer support element and the inner support element within the interior volume.

In another aspect, the disclosure is directed to a spreader mechanism for use in a V-clamp installation tool. The spreader mechanism may include, for example, an elongate hollow outer support element having a proximal end and a distal end, the hollow outer support element defining an interior volume, a first spreader hook coupled to the outer support element at or near the proximal end of the outer support element, an elongate inner support element having a proximal and a distal end, the inner support element slidably positioned at least partially within the interior volume, a second spreader hook coupled to the inner support element at or near the proximal end of the inner support element, and a jackscrew assembly including a jackscrew body mechanically retained to one of the outer support element and the inner support element and a corresponding jackscrew nut mechanically retained to the other support element. The jackscrew may be configured to move the spreader hooks apart when turned in one direction and to move the spreader hooks together when turned in the other direction.

Various additional aspects and details are described subsequently herein in conjunction with the appended drawing figures.

BRIEF DESCRIPTION OF THE DRAWINGS

The present application may be more fully appreciated in connection with the following detailed description taken in conjunction with the accompanying drawings, wherein.

DETAILED DESCRIPTION

Overview

Figure 1:
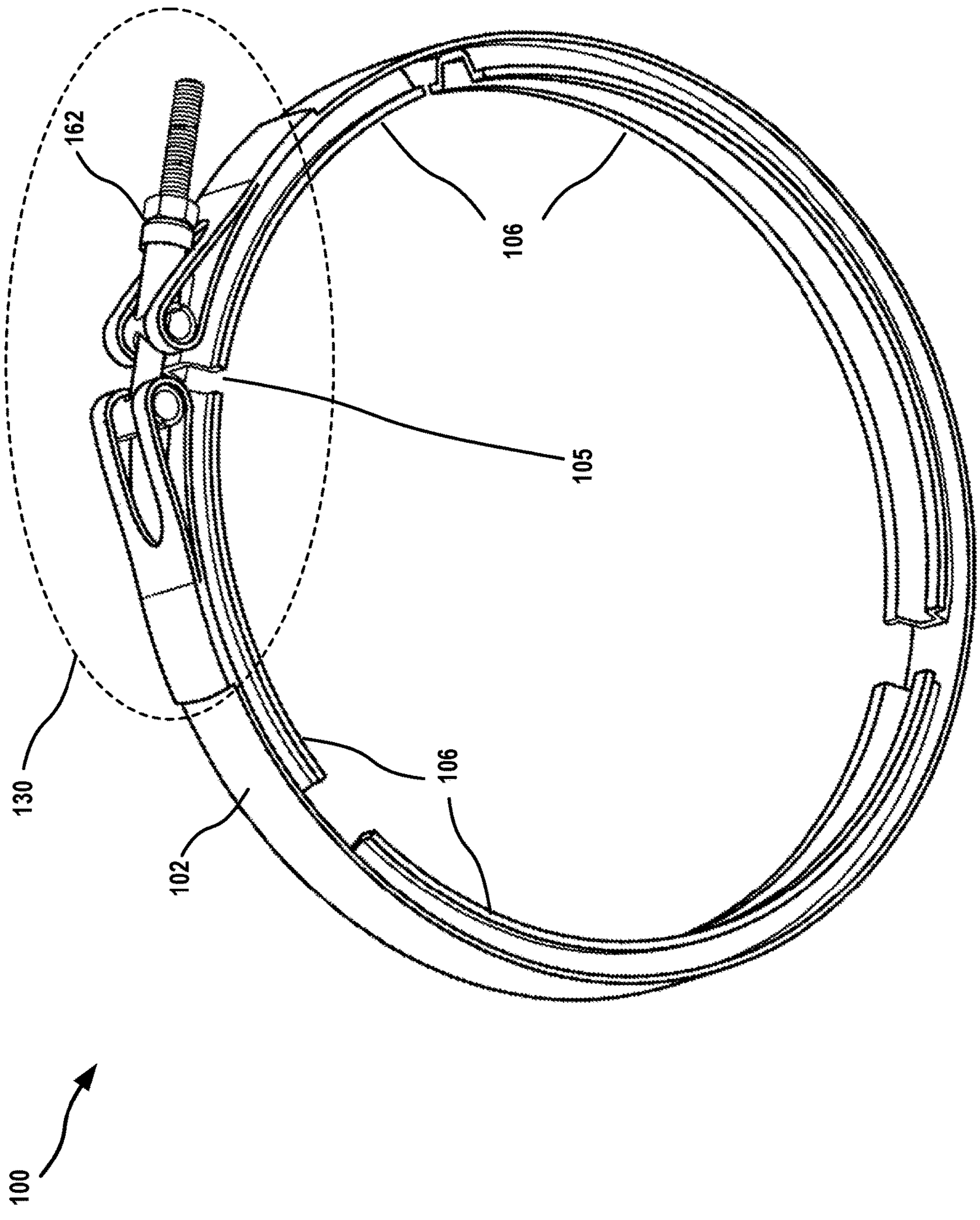
FIG. 1 is an illustration of a typical prior art V-clamp.

In one aspect the disclosure is directed to a V-clamp installation/removal tool. The tool may include, for example, a spreader mechanism. The spreader mechanism may include an elongate hollow outer support element having a proximal end and a distal end, the hollow outer support element defining an interior volume, a first spreader hook coupled to the outer support element at or near the proximal end of the outer support element, an elongate inner support element having a proximal and a distal end, the inner support element slidably positioned at least partially within the interior volume, a second spreader hook coupled to the inner support element at or near the proximal end of the inner support element, and a spring positioned between the outer support element and the inner support element within the interior volume. The tool may further include an actuator cable having a tubular outer element and an inner cable slidable within the tubular outer element. The tool may further include a plier element having a first handle mechanically fixed to a first jaw and first gripping element and a second handle mechanically fixed to a second jaw and second gripping element with the first handle and second handle pivotably coupled. The distal end of the actuator cable outer element may be mechanically coupled to the outer support element and the actuator cable inner cable is mechanically coupled to the inner support element. The proximal end of the actuator cable outer element may be mechanically coupled to one of the gripping elements and the proximal end of the actuator cable inner cable may be mechanically coupled to the other gripping element.

The hollow outer support element may, for example, include a tubular section defining the interior volume. The tubular section may have a rectangular cross-sectional shape and/or a round cross-sectional shape. The outer tubular element may include a plastic material and the inner cable may include a metallic wire. The first and/or second spreader hooks may include slots or openings to position the hooks about a V-clamp bolt during attachment to a V-clamp.

In another aspect, the disclosure is directed to a spreader mechanism for use in a V-clamp installation tool. The spreader element may include, for example, an elongate hollow outer support element having a proximal end and a distal end, the hollow outer support element defining an interior volume, a first spreader hook coupled to the outer support element at or near the proximal end of the outer support element, an elongate inner support element having a proximal and a distal end, the inner support element slidably positioned at least partially within the interior volume, a second spreader hook coupled to the inner support element at or near the proximal end of the inner support element, and a spring positioned between the outer support element and the inner support element within the interior volume.

The hollow outer support element may, for example, include a tubular section defining the interior volume. The tubular section may have a rectangular cross-sectional shape and/or a rounded cross-sectional shape. The inner support element may include a solid and/or a hollow tubular section. The inner support element may include a tube having a rectangular cross-sectional shape and/or a round cross-sectional shape. The first and/or second spreader hooks may have a hook portion with a substantially circular cross-sectional shape. The first and/or second spreader hooks may include slots to position the hooks about a V-clamp bolt during attachment to a V-clamp.

In another aspect, the disclosure is directed to a spreader mechanism for use in a V-clamp installation tool. The spreader mechanism may include, for example, an elongate hollow rectangular tubular cross-sectional outer support element having a proximal end and a distal end, the hollow outer support element defining an interior volume, a first spreader hook coupled to the outer support element at or near the proximal end of the outer support element, the first spreader hook having a hook-shaped portion with a substantially circular cross sectional shape and a slot therein to position the first spreader hook about a V-clamp bolt, an elongate inner support element having a proximal and a distal end, the inner support element slidably positioned at least partially within the interior volume, a second spreader hook coupled to the inner support element at or near the proximal end of the inner support element, the second spreader hook having a hook-shaped portion with a substantially circular cross sectional shape and a slot therein to position the second spreader hook about the V-clamp bolt, and a spring positioned between the outer support element and the inner support element within the interior volume.

In another aspect, the disclosure is directed to a spreader mechanism for use in a V-clamp installation tool. The spreader mechanism may include, for example, an elongate hollow outer support element having a proximal end and a distal end, the hollow outer support element defining an interior volume, a first spreader hook coupled to the outer support element at or near the proximal end of the outer support element, an elongate inner support element having a proximal and a distal end, the inner support element slidably positioned at least partially within the interior volume, a second spreader hook coupled to the inner support element at or near the proximal end of the inner support element, and a jackscrew assembly including a jackscrew body mechanically retained to one of the outer support element and the inner support element and a corresponding jackscrew nut mechanically retained to the other support element. The jackscrew may be configured to move the spreader hooks apart when turned in one direction and to move the spreader hooks together when turned in the other direction.

The hollow outer support element may include a tubular section defining the interior volume. The tubular section may include a tube having a rectangular cross-sectional shape and/or a round cross-sectional shape. The inner support element may include a hollow tubular section. The inner support element may include a tube having a rectangular cross-sectional shape and/or a round cross-sectional shape. The first and/or second spreader hooks may have a hook portion with a substantially circular cross-sectional shape. The first and/or second spreader hooks may include slots to position the hooks about a V-clamp bolt during attachment to a V-clamp.

Various additional details and aspects are described subsequently herein in conjunction with the appended drawing figures.

It is noted that as used herein, the term "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

Figure 5:
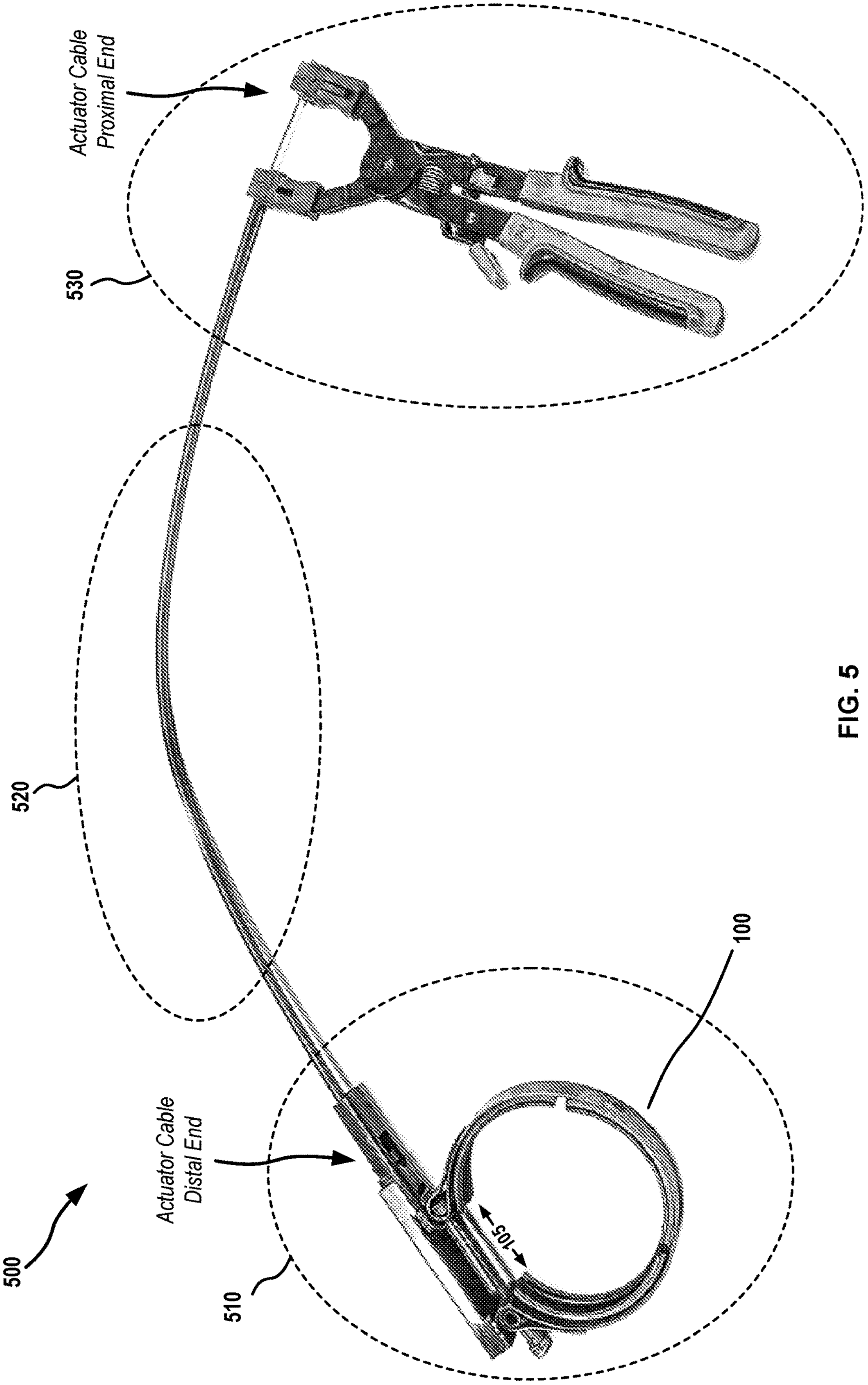
FIG. 5 is an image illustrating details of one embodiment of a V-clamp installation tool including a spreader mechanism, an actuator cable, and a spreader plier in use on a V-clamp.

Turning to FIG. 5, details of an exemplary embodiment 500 of a V-clamp installation/removal tool (also denoted herein as a "V-clamp tool" for brevity) are shown with V-clamp 100 in an open or spread apart position as reflected by the large gap or opening 105 in the band. The open or spread apart position is described subsequently herein with respect to FIG. 6A. Tool 500 advantageously positions and locks a V-clamp such as V-clamp 100 in the open position to facilitate installation and/or removal of the V-clamp onto corresponding pipe sections or when joining other elements when a user squeezes the handles of the plier element 530. Details of plier element embodiment 530 are described subsequently herein with respect to FIGS. 13 and 14. In an exemplary embodiment, plier element 530 comprises a Snap-On™ tools plier model SHCP1A or other similar or equivalent plier tools as are known or developed in the art.

Figure 6A:
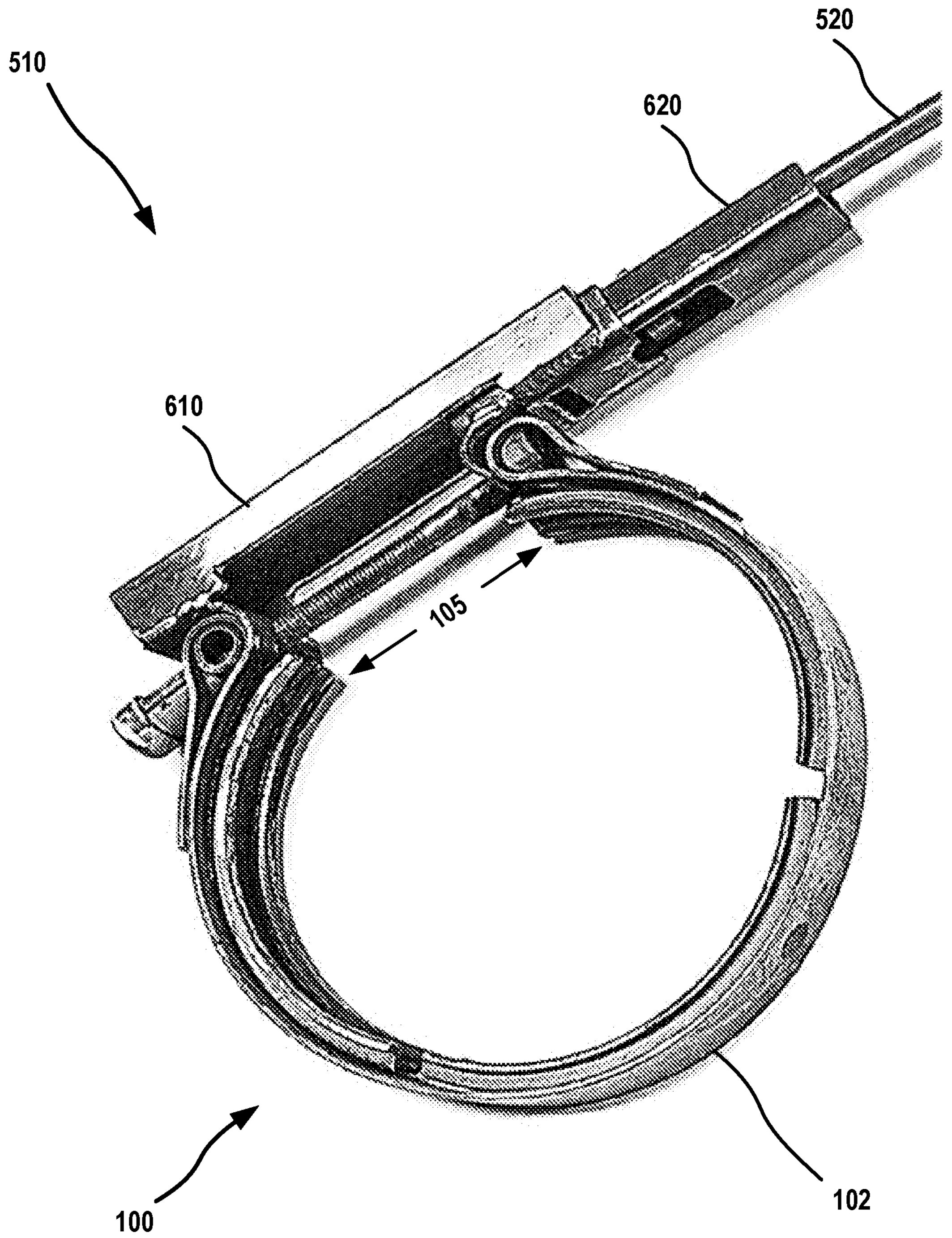
FIG. 6A is an image showing details of the spreader mechanism embodiment of the V-clamp adjustment tool of FIG. 5 in an open position, with hooks engaged with a V-clamp in the spread open position.
Figure 6B:
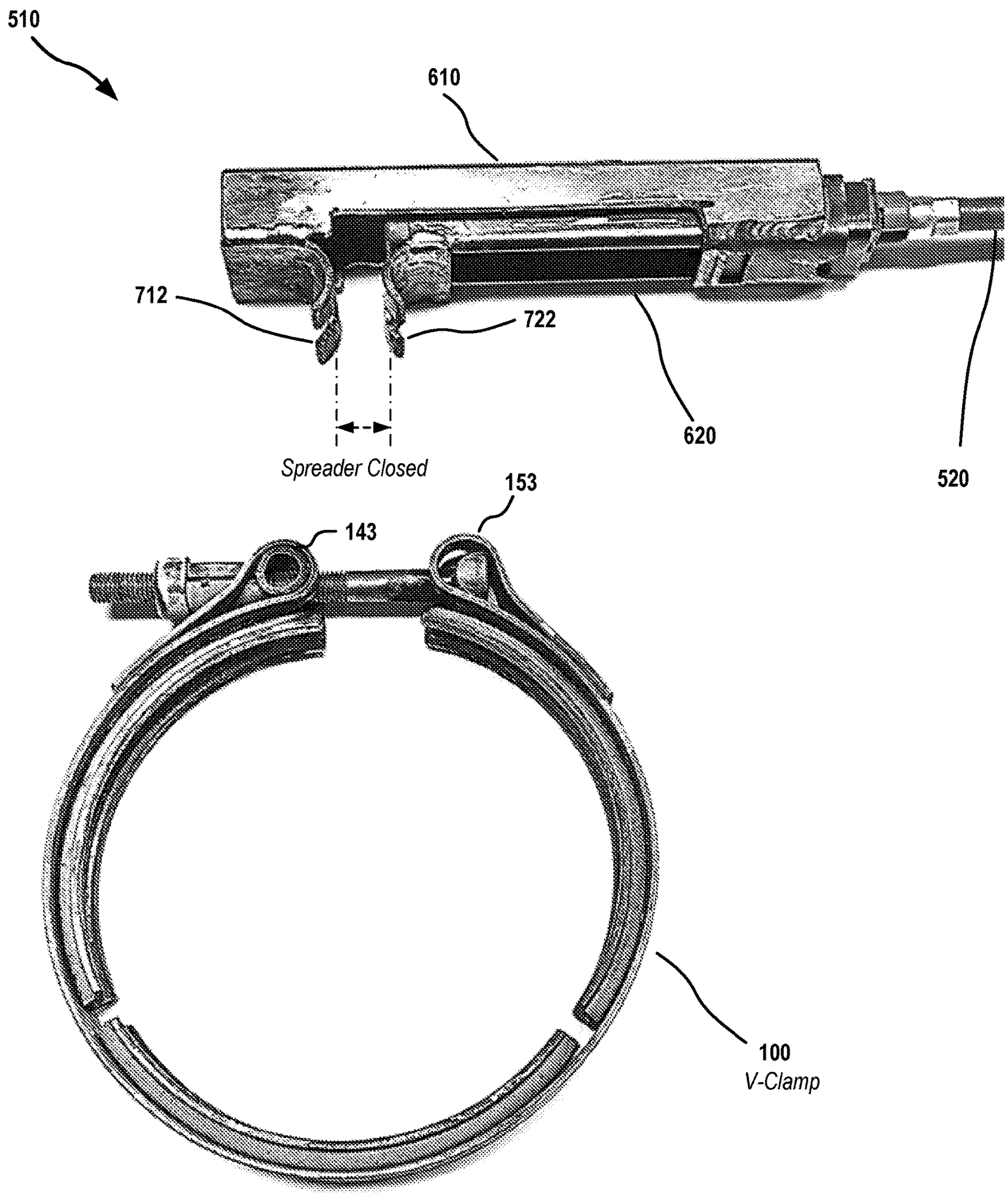
FIG. 6B shows images of the spreader mechanism embodiment of FIG. 6A in the closed position, with the V-clamp shown in a corresponding un-spread or released position.

The V-clamp may correspondingly return to the closed or released position (e.g., as shown in FIG. 6B) when the plier handles are released or the plier element or equivalent (e.g., a jackscrew, etc.) is otherwise disengaged. The plier element may include a locking mechanism to retain the V-clamp in the spread apart position while a user moves and manipulates the spread apart V-clamp into place over the pipe joint, and then when the plier locking mechanism is released the V-clamp will return (e.g., by a spring or other equivalent mechanism) to its released position, allowing the user to fully tighten the V-clamp by turning nut 162 or other clamping mechanism.

In the exemplary embodiment shown in FIG. 5, V-clamp tool 500 includes three interconnected components including a spreader mechanism embodiment 510 (also denoted herein as a "spreader" for brevity), an actuator cable embodiment 520 (also denoted herein as an "actuator cable" for brevity), and a plier element embodiment 530 (also denoted herein as a "plier" for brevity.

The actuator cable 520 may include two or more concentric elongate elements, such as an outer tubular element or sheath (also denoted as an "outer tube" for brevity) and an inner wire or cable (also denoted herein as an "inner cable" for brevity) slidable within the outer tubular element. Other V-clamp tool embodiments may include variations of these elements as well as more elements or, in some embodiments, fewer elements that are configured to implement the same or similar functionality to open and secure the V-clamp in a spread open position as shown in FIG. 5 and also position it in a released state when the plier or other equivalent element is in a released position. Lubricants and/or other components may be included the actuator cable in alternate embodiments, such as additional inner cables, frictional elements to control the sliding rate of the cable, inner cable locking elements, additional outer sheaths or covers, and the like.

Figure 2A:
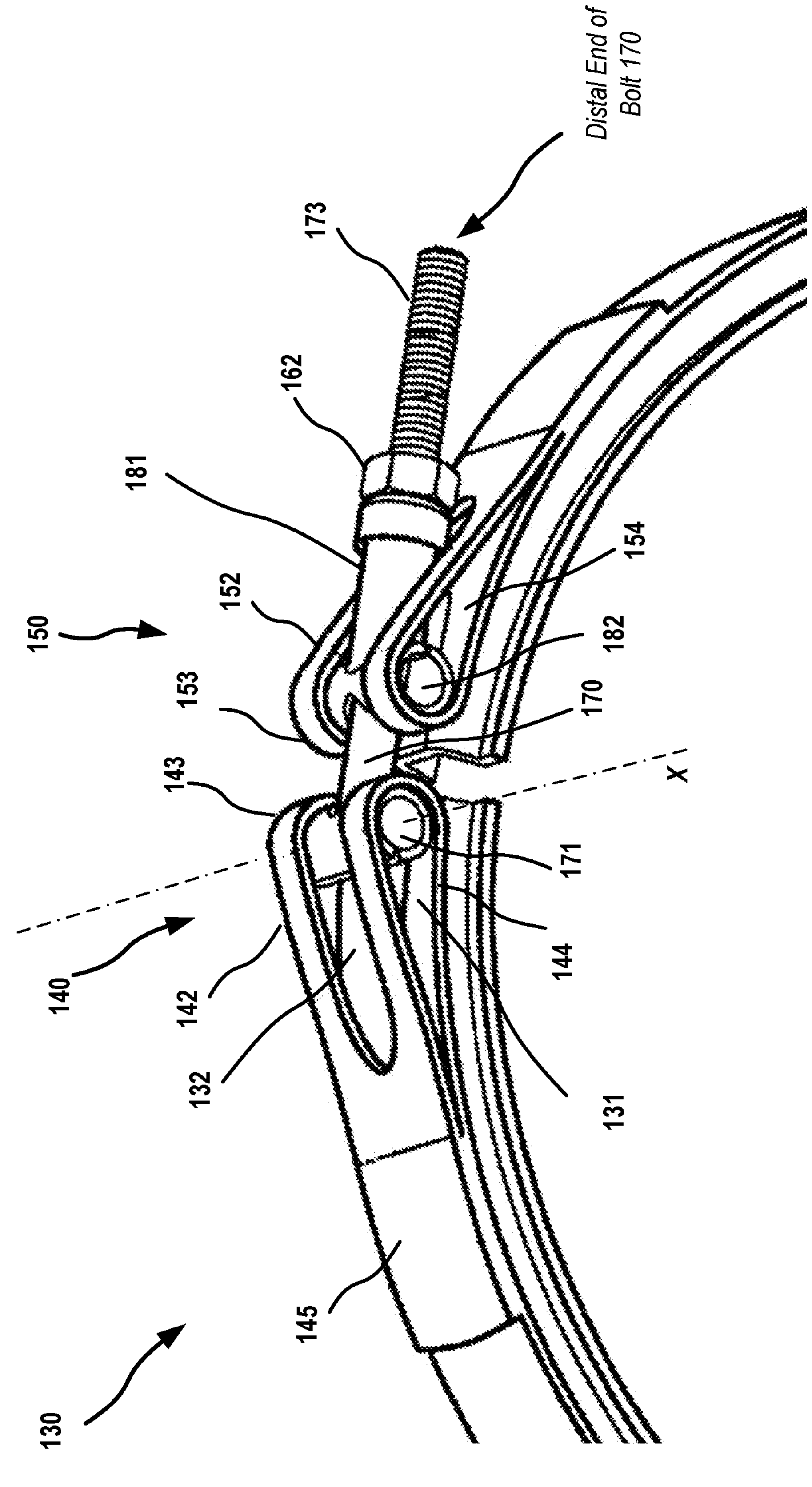
FIG. 2A is an illustration of additional details of the V-clamp of FIG. 1.
Figure 2B:
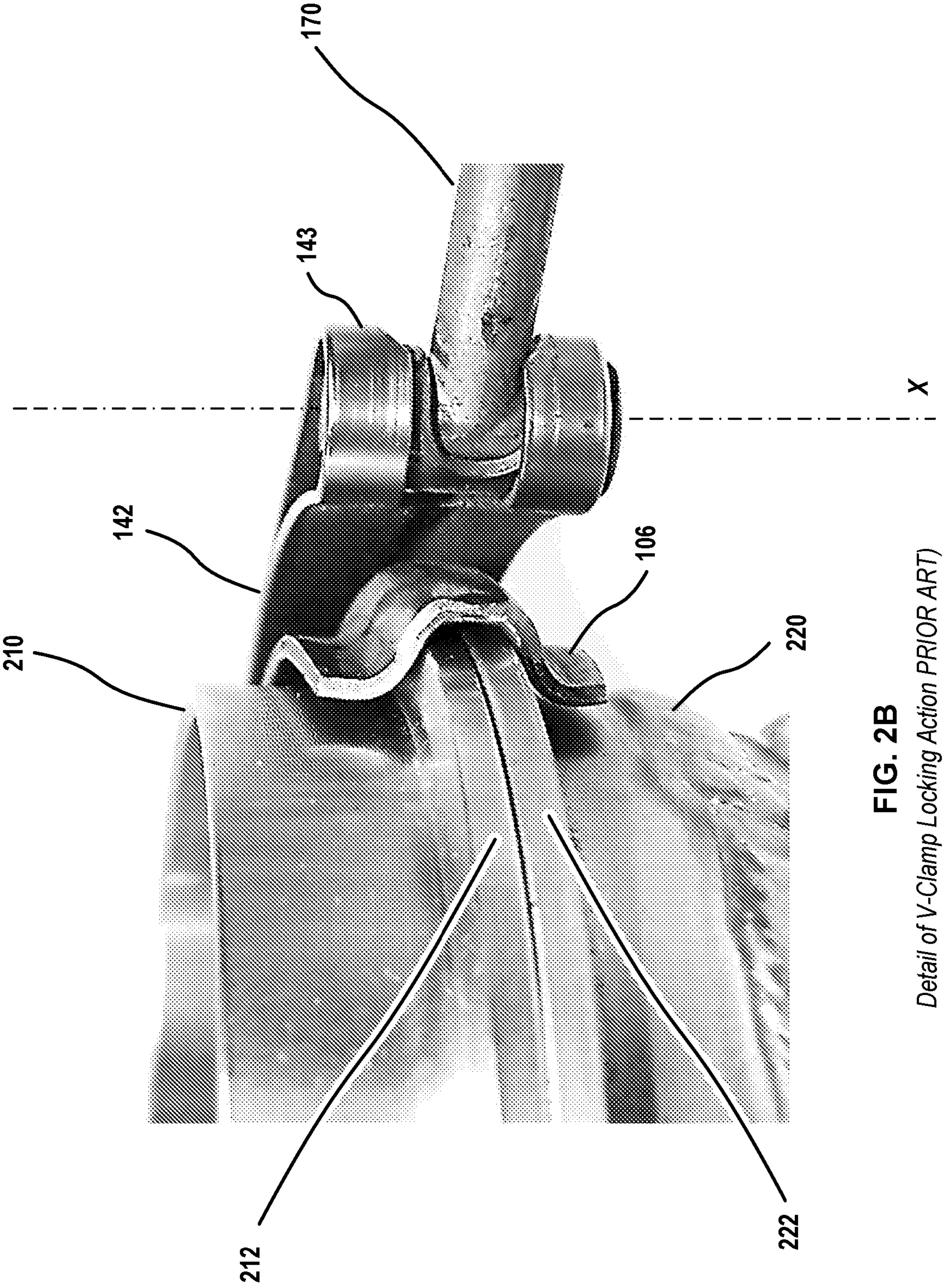
FIG. 2B is an image showing additional details of a prior art V-clamp such as shown in FIG. 1.
Figure 9A:
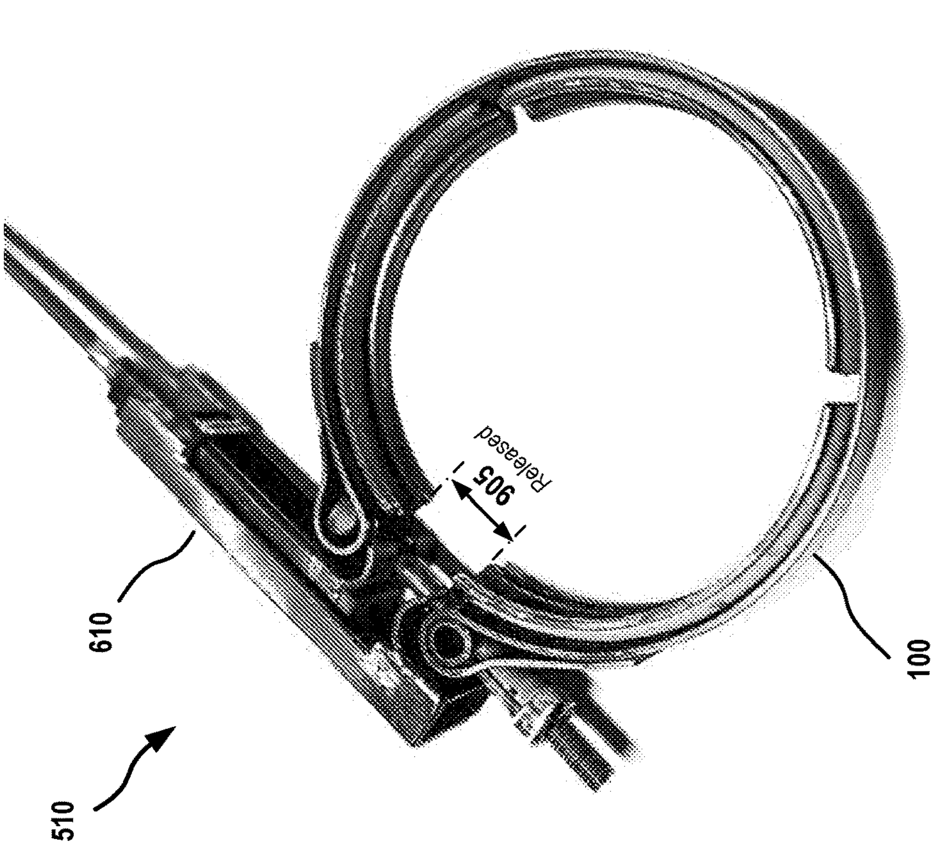
FIG. 9A is an image illustrating details of the spreader mechanism embodiment of FIG.5 showing the spreader mechanism in the closed position as shown in FIG. 6B and the V-clamp in the corresponding closed or released position.
Figure 14:
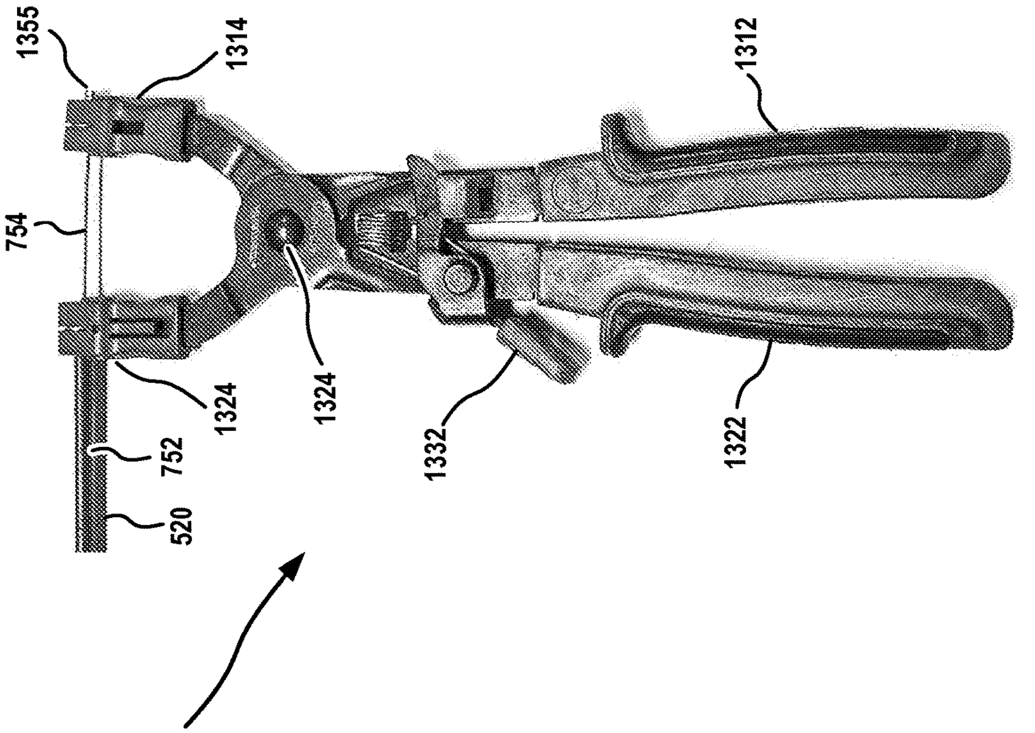
FIG. 14 is an image showing details of an embodiment of a spreader pliers of the V-clamp installation tool embodiment of FIG. 5 when the V-clamp is in an open or spread apart position.

In operation, a user positions the spreader mechanism element of the tool, such as spreader 510 shown in FIG. 5, over the loosening/tightening assembly of the V-clamp, and engages two or more hooks or other catch elements, such as hooks 712 and 722 as shown in FIG. 7, with corresponding bracket elements of the V-clamp, such as brackets 143 and 153 of V-clamp 100 as shown in FIG. 2A. Once engaged, and assuming the V-clamp is initially in a closed or released position (e.g., the nut element of the V-clamp, such as nut 162 of FIG. 2A, is loosened on the corresponding bolt element 170 and the V-clamp is in the released position as shown in FIG. 9A), a user may squeeze or otherwise actuate handles or similar or equivalent movable elements of a plier mechanism such as pliers 530, or a similar or equivalent mechanism. FIG. 14 shows the pliers 530 in a configuration that spreads the V-clamp apart when the handles are squeezed. The plier may be locked in place in this position while a user installs the V-clamp over a pipe joint. For example, the exemplary plier tool includes a locking latch 1332 to lock the plier in a particular position. The lock may later be released to allow for tightening of the V-clamp on the pile joint.

Figure 9B:
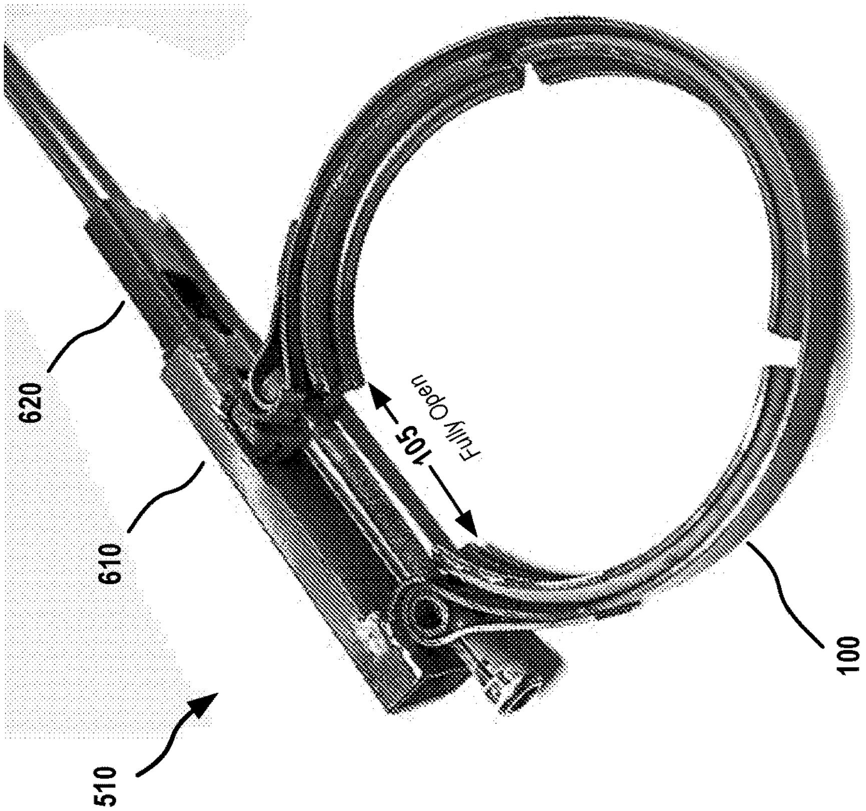
FIG. 9B is an image illustrating details of the spreader mechanism embodiment of FIG. 5 showing the spreader mechanism in the open position as shown in FIG. 6A and the V-clamp in the open or spread apart position.
Figure 13:
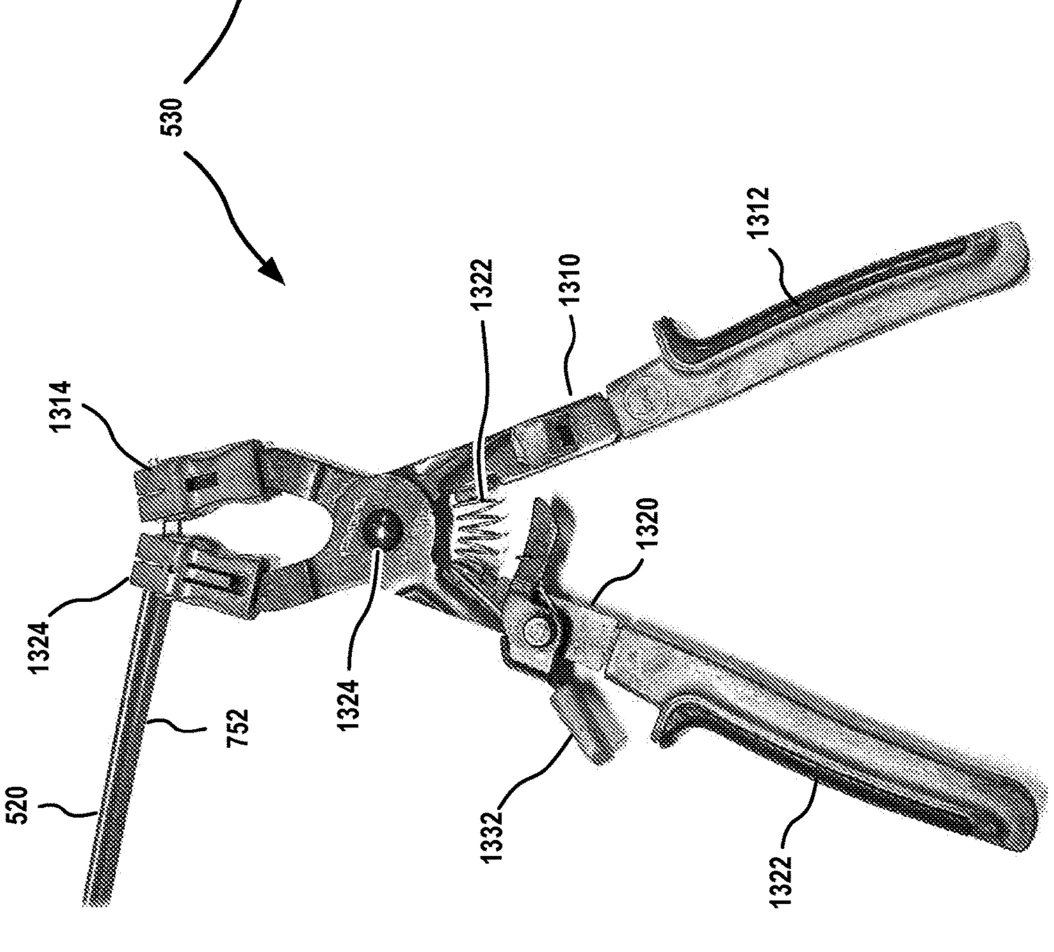
FIG. 13 is an image showing details of an embodiment of spreader pliers of the V-clamp installation tool embodiment of FIG. 5 when the V-clamp is in a closed or released position.

The movable elements may be handles 1312 and 1322 of plier element 530 such as are shown in FIGS. 13 & 14. Squeezing of the handles 1312 and 1322 (or similar or equivalent movement of corresponding elements of an alternate plier mechanism) causes the hooks 712 and 722 of the spreader element to move apart and thereby widen the gap in the V-clamp 100 band (i.e., gap 105 widened to the fully opened position as shown in FIG. 9B). The hooks are spread apart by movement of the inner support element relative to the outer support element resulting from a sliding movement of the inner cable relative to the outer tubular element or sheath of the actuator cable 520 when the plier 530 handles are squeezed.

FIG. 6A illustrates details of the spreader element embodiment 510 in the open or spread apart position with a V-clamp on the tool. In the exemplary embodiment of FIG. 6A, spreader element 510 includes an elongate inner tubular rectangular cross-section bracket support element 620 positioned within an elongate outer tubular rectangular cross-sectional bracket support element 610 so that the inner support element 620 slides within outer support element 610 when the plier element is actuated. The sliding may be effected by movement of the wire of the actuation cable relative to the outer tube. Other embodiments may include alternate shapes of the bracket support elements, such as a circular tubular cross-sectional shape, triangular cross-sectional shape, or other cross-sectional shapes. The cross-sectional shapes and/or sized may vary along the length of the bracket support elements in some embodiments.

When the V-clamp is in the fully spread or open configuration as shown in FIG. 6A, the diameter of the V-clamp will be increased relative to the released or relaxed position so that the claim can more easily be placed over flanges of the pipe sections being joined, with the increased diameter reflected as a large gap 105 (relative to the released state gap 105) in the V-clamp band 102.

Figure 3:
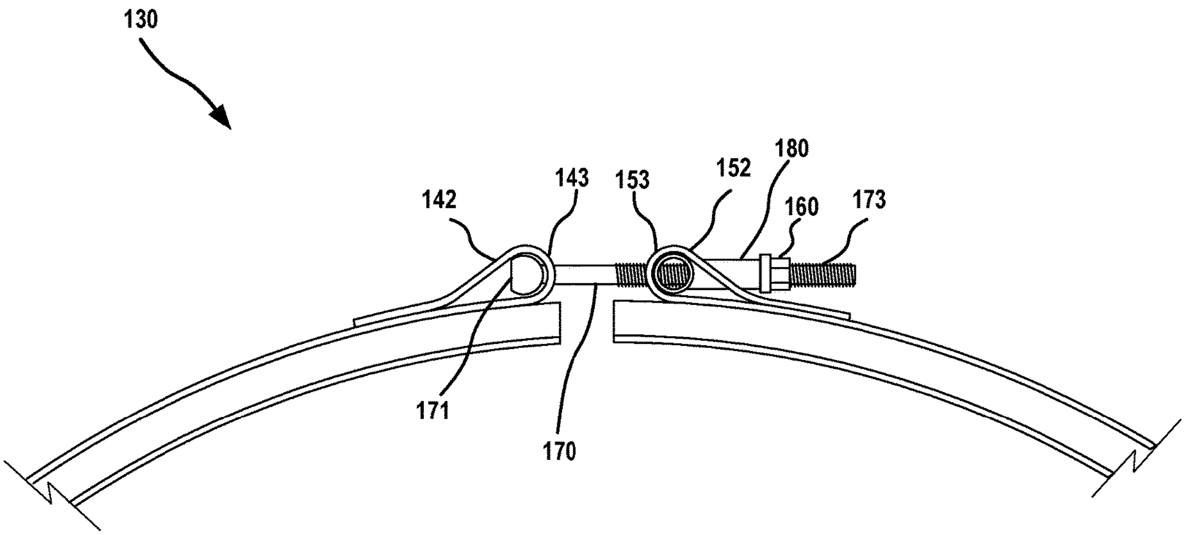
FIG. 3 is an illustration of a prior art clamping adjustment mechanism on a V-clamp such as shown in FIG. 1.
Figure 4:
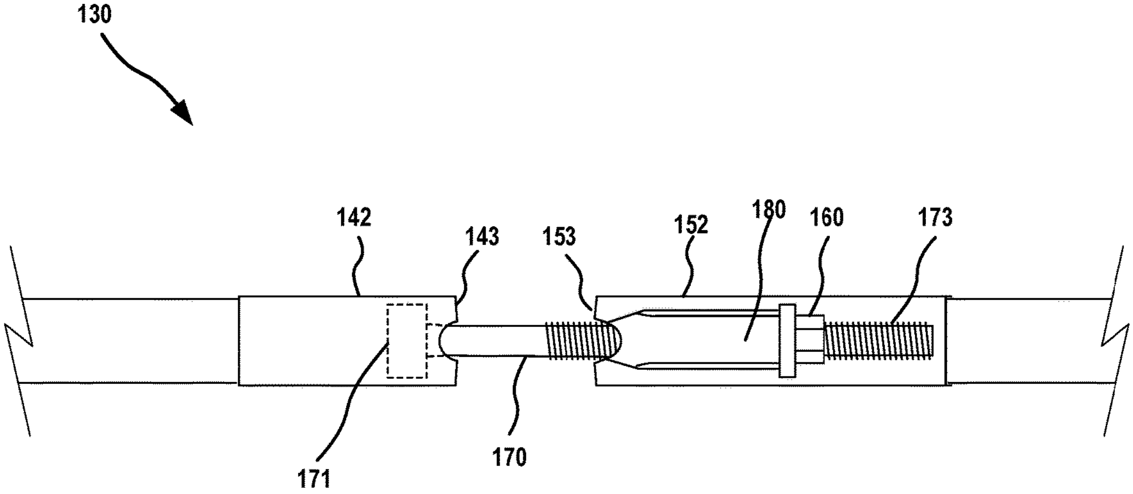
FIG. 4 is an illustration of additional details of the adjustment mechanism shown in FIG. 3.

The configuration of FIG. 6A is how the V-clamp would typically be spread apart so that it can be positioned over flanges of two pipe sections being joined. If the plier element is locked at this position so that the inner wire of the actuator cable is fixed relative to the outer tube, the V-clamp can be readily moved about in order to get it positioned properly over the pipe sections being joined (e.g., due to inherent spring action in the band). When a user aligns the pipe sections and their flanges within the V-clamp, the plier element can be released, allowing the V-clamp to return, such as through spring action, to its released position where the gap 105 is minimized, such as is shown in FIG. 9A. The V-clamp can then be tightened to the desired operational tension by turning nut 160 (e.g., as shown in FIG. 3) inward onto bolt 170. The V-clamp tool 100 can be removed when the plier element is released or when the nut is tightened to its final tightness or torque value.

Figure 11:
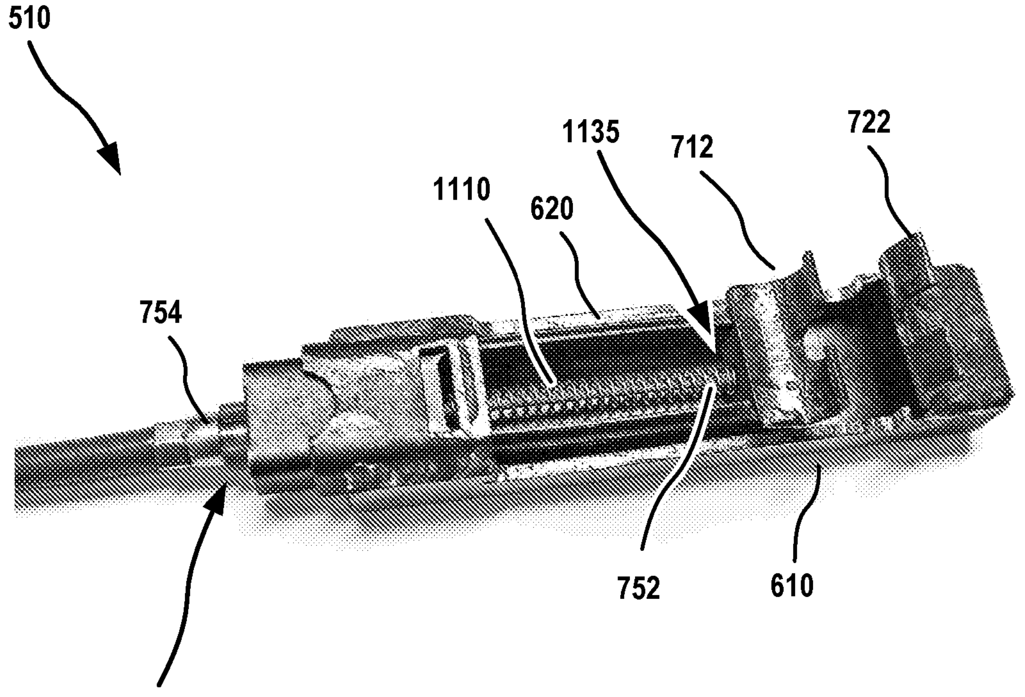
FIG. 11 is an image illustrating additional details of the spreader mechanism embodiment of FIG. 5, 6A, and 6B while in a closed or released position.
Figure 12:
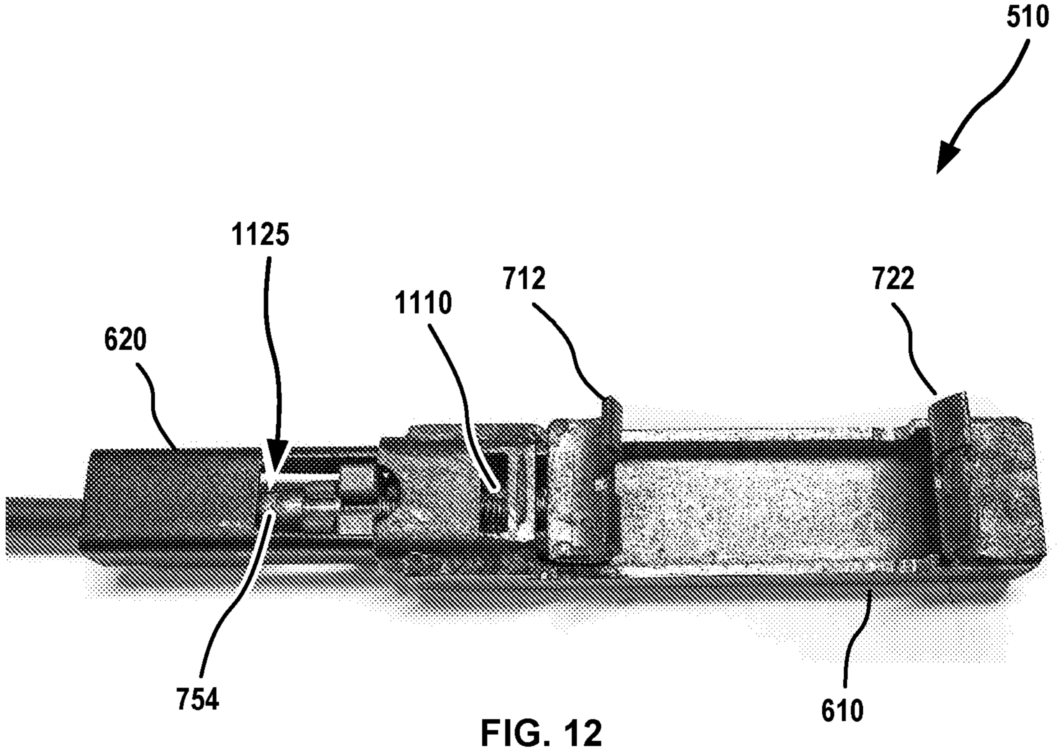
FIG. 12 is an image illustrating additional details of the spreader mechanism embodiment of FIG. 5, 6A, and 6B while in an open or spread apart position.

The distal ends of the actuator cable 520 outer tube and inner cable may be mechanically coupled to the inner slide support element 620 and outer slide support element 610 to allow the inner slide support element to slide relative to and within the outer slide support element when the inner cable moves relative to the outer tube in response to plier 520 actuation. FIG. 11 and FIG. 12 illustrate exemplary mechanical connection points between the actuator cable 520 and the spreader element 520 to facilitate this sliding motion. The distal end 1135 of the inner cable may be mechanically coupled to the inner slide support element 620, and the distal end 1154 of the outer tube may be coupled to the outer slide support element 610. Additional details of an embodiment of mechanic coupling of ends of the actuator cable to the plier and spreader, respectively, as shown in FIGS. 7A and 7B.

Figure 8:
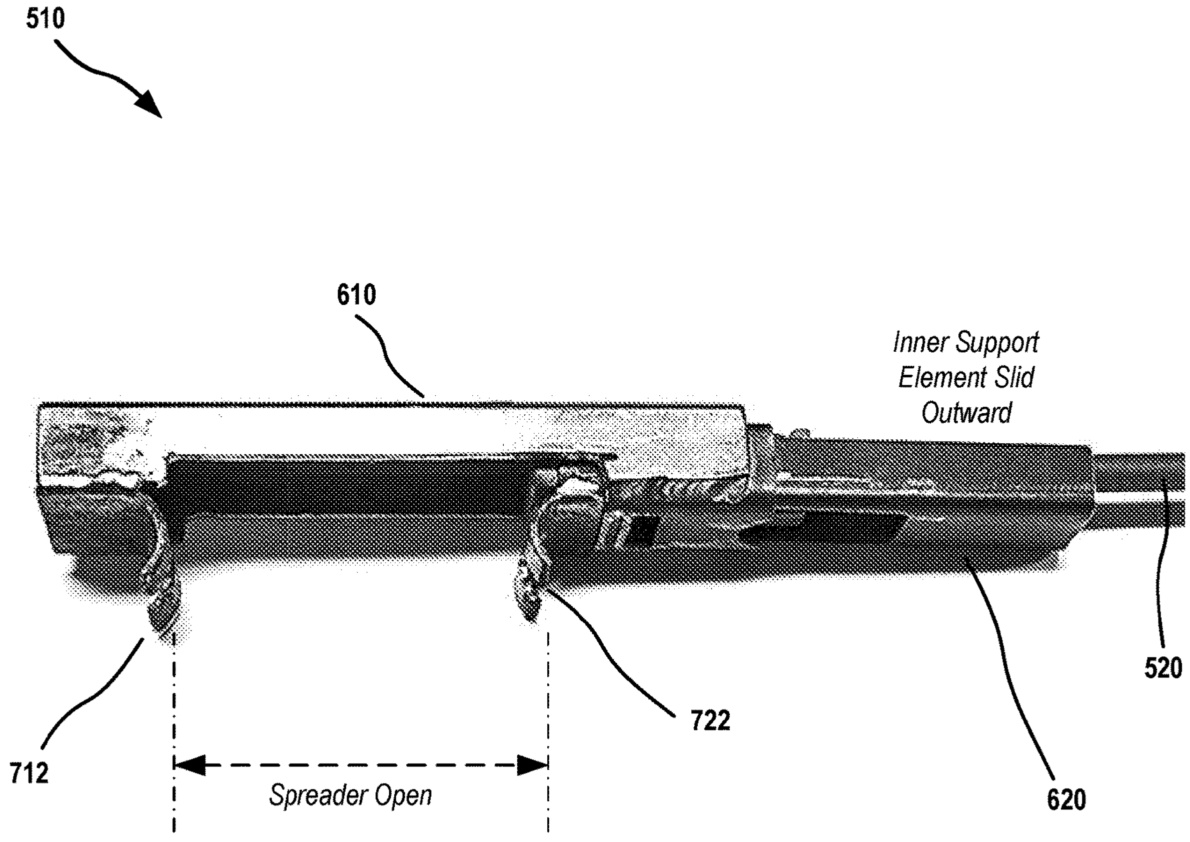
FIG. 8 is an image illustrating additional details of the spreader mechanism embodiment of FIG. 5 in the spread open position as shown in FIG. 6A illustrating the hooks spread apart to expand the V-clamp diameter.

Squeezing the handles of the plier element 530 to the position shown in FIG. 14 (relative to the position shown in FIG. 13) causes the inner cable 752 of the actuator cable 520 to slide outward (as shown in FIG. 14) relative to the outer tubular element 752, which causes the spreader mechanism 510 to open as shown in FIG. 8, positioning the V-clamp in the open or spread apart position shown in FIGS. 6A and 9B. Conversely, opening or releasing the handles of the plier element 530 as shown in FIG. 13 causes the spreader element to a closed position as shown in FIG. 9A.

Action of the hooks 712 and 722 may be implemented using, for example, a simple cable assembly such as shown in actuator cable embodiment 520 where an inner cable moves relative to an outer tube when the plier handles are squeezed. An actuator cable such as actuator cable 520 may include an inner movable wire or cable or other small cross-sectioned elongate element, e.g., a solid or twisted/braided wire such as inner cable 752 as shown in FIG. 7B, and a separate outer tube, such as outer sheath 754 as shown in FIG. 7A, with the movable inner cable slidable within the outer tube. For example, a simple actuator cable can be in the form of a vehicle control cable (e.g., bicycle brake or shift cable, automobile emergency brake cable, etc.), where a solid, braided, or stranded inner wire slides longitudinally within an axially semi-rigid outer tube or other similar or equivalent structure.

Figure 7A:
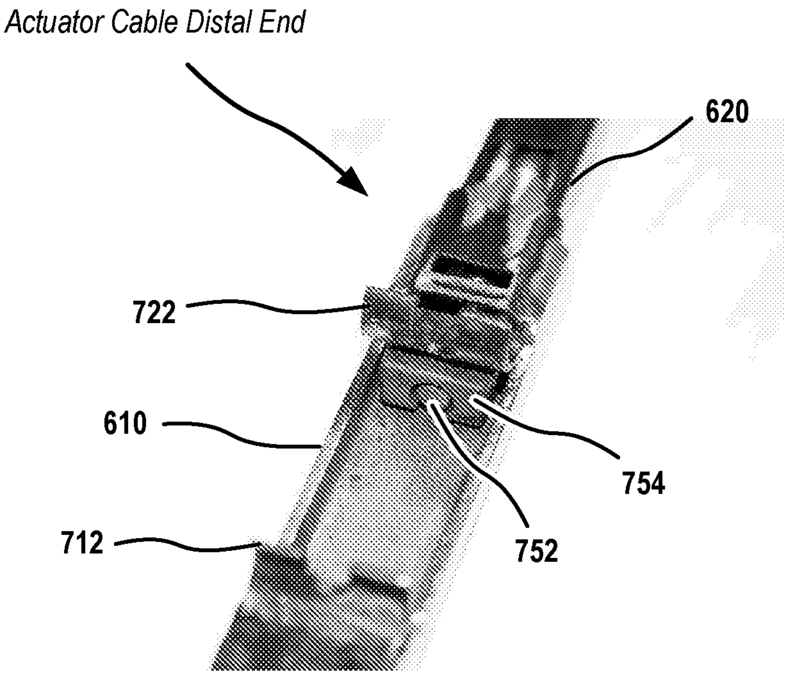
FIG. 7A illustrates details of an embodiment of the distal end of an actuator cable such as shown in FIG. 5 as coupled to the spreader mechanism embodiment of FIG. 5.
Figure 7B:
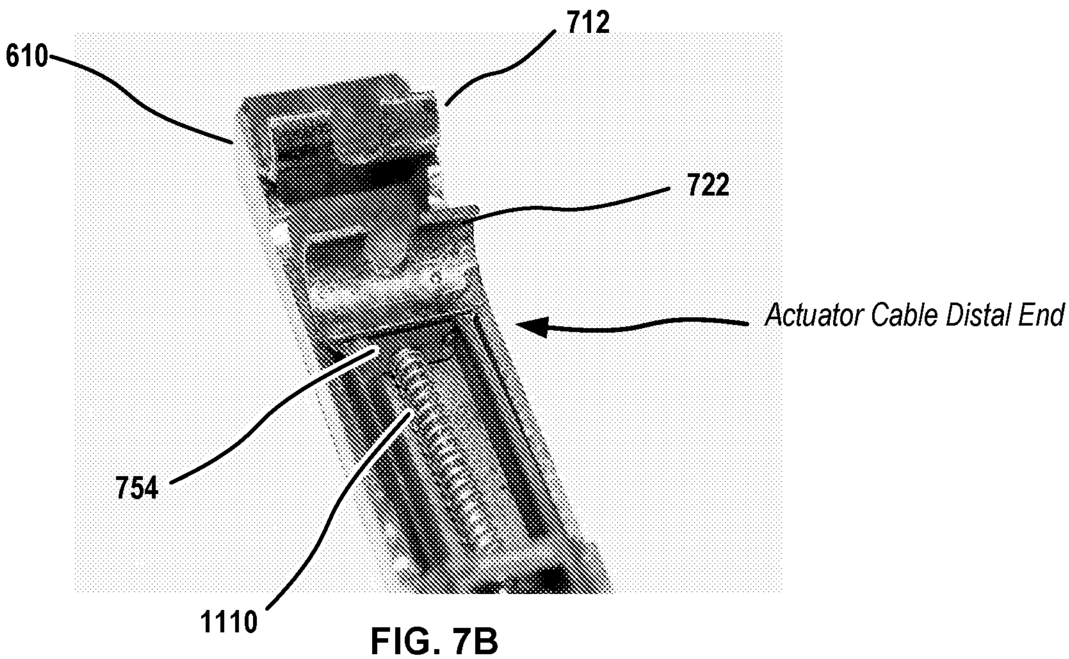
FIG. 7B illustrates additional details of the distal end of the actuator cable embodiment of FIG. 7A as coupled to the spreader mechanism embodiment of FIG. 5.

FIG. 7A illustrates additional details of mechanical coupling at the distal end of the actuator cable to the spreader. In this figure the spreader is in an open or spread-apart position, corresponding to when the V-clamp is spread apart. The actuator cable distal end may have a crimped or swaged on termination, such as cap 752 at distal end 1135 of the inner cable, with the cap and inner cable retained by a slidable lock 754 mechanically coupled to the inner slide support element 620.

FIG. 7B illustrates additional details of mechanical coupling as shown in FIG. 7B. In this figure the spreader is in a closed or released position, corresponding to when the V-clamp is closed or released. The coupling mechanism of the spreader may include a spring such as spring 1110 as shown to force the spreader into a normally closed position. Use of such a spring allows the tool to normally be in the closed or released position except when a user actuates the plier handles to place the V-clamp in the spread apart position.

Figure 7C:
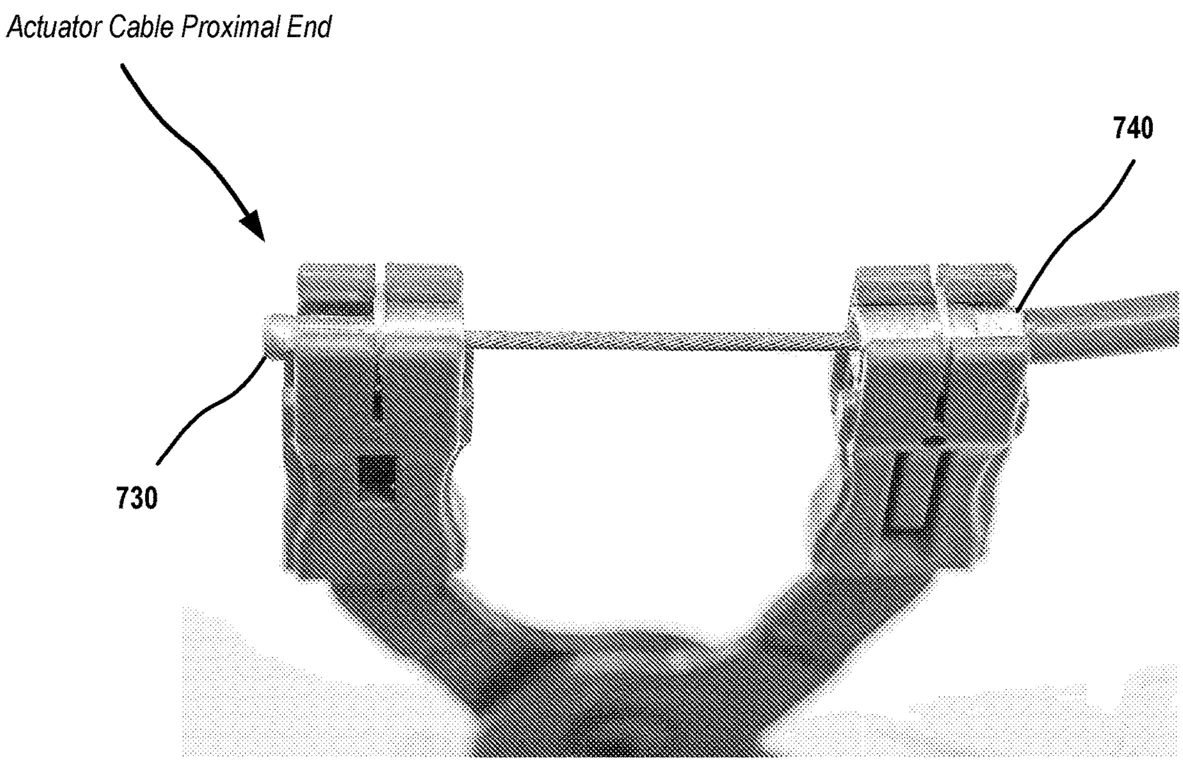
FIG. 7C illustrates details of a proximal end of the actuator cable embodiment of FIG. 5 as coupled to spreader pliers.

FIG. 7C illustrates details of mechanical coupling of the proximal end of the actuator cable to the plier. The proximal end of the actuator cable may include a crimped or swaged on cap 730 to retain the inner cable element of the actuator cable to one jaw of the plier and another cap 740 or other mechanism coupled to the outer tube of the actuator cable to retain it to the other jaw of the plier as shown. In this way, the inner cable moves relative to the outer tube of the actuator cable when the plier handles are actuated.

The outer tube of the actuator cable is preferably rigid axially but partially flexible in cross-section, e.g., when bent in a direct 90 degrees from the longitudinal axis. In an exemplary embodiment, partially flexible plastic or polymer materials may be used for the outer tube and a solid, braided, or twisted metallic wire may be used for the inner wire.

Additional layers, such as concentric strengthening or liquid/lubricant insulating layers (not shown) may also be included. In a typical embodiment the inner wire is sized to fit snugly within the outer tube while still being slidable within the hollow elongate opening of the outer tube. This may aid in minimizing flex when the wire is moved within the tube during actuation. A lubricating material, such as an oil, silicone, or other lubricant may be placed in the inner volume of the actuator cable (i.e., inside the outer tube and in contact with the inner cable) to minimize friction during the inner cable's movement. As described previously, movement of the inner cable relative to the outer tube, when actuated by the plier element 530, causes the hooks 712 and 722 of the spreader element to move apart (so as to open the V-clamp gap 105 as shown in FIGS. 1 and 5). Conversely, the plier element jaws may be moved in the opposite way to move the hooks to the released position, where the gap 105 is typically minimal.

In an alternate configuration, a jack screw mechanism may be used in place of the plier and actuator cable as described herein to open or close the spreader. For example, in one embodiment a threaded jack screw body may be held captive at one of the spreader support elements and a corresponding threaded nut may be held captive at the other spreader support element. The jackscrew body may be positioned so that the nut may be turned by a user while on the threaded portion of the jack screw body to cause spreader hook opening and closing. For example, the spreader hooks and corresponding opening may be widened by turning the nut in one direction and correspondingly contracted by turning the nut in the other direction. An optional spring may be used to assist in moving the spreader elements and/or in retaining them in a released position when the nut is not being turned. In an alternate embodiment, the nut or similar threaded element or mechanism may be held in a fixed position on one of the spreader support elements with the jack screw body retained to the other support element so as to move the hooks together or apart when the jackscrew body is rotated by a user.

As described previously, these actions allows a user to position the spreader mechanism 510 onto V-clamp 100, spread the brackets apart to widen the gap in the V-clamp by actuating the plier element 530, which moves the hooks 712 and 722 apart, and then fit the spread-open V-clamp over two tube end flanges held in approximately joined position. The plier may then be released, removing the spreader mechanism to allow tightening of the V-clamp on the pipe ends to lock the joint. This can be advantageously be used to free up a user's hand from having to hold the V-clamp in a spread open position.

By attaching the ends of the outer tube at the distal end to a first part of the spreader, such as outer housing element embodiment 610 as shown in FIG. 6, and at the proximal end to one of the jaws of the plier element (e.g., as shown in FIG. 13), and attaching the inner cable at the distal end to a second part of the spreader element and at the other end to the other jaw of the plier element (e.g., as shown in FIG. 13), the wire can move within the outer tube and cause the second part of the spreader element to movable slide relative to the first part of the spreader element. Additional details of such an exemplary embodiment are illustrated in FIG. 6 through FIG. 13.

Additional details of the exemplary embodiment of the spreader element 510 in a closed position are shown in FIG. 9A in conjunction with correspondingly positioned V-clamp 100. This position of spreader element 510 will typically be used when the plier element is in its released position as shown in FIG. 13. V-clamp 100 is shown in its corresponding released position, with the gap 905 in a released or smaller (relative to the fully opened) size.

To spread the V-clamp 100 for installation on a pipe joint, a user first engages hooks 712 and 722 with corresponding brackets such as is shown in FIG. 9A. As the plier element is tightened, such as through squeezing the handles 1322 and 1312 together from their position in FIG. 13 to their position in FIG. 14, the inner wire of the actuator cable moves relative to the outer tube, causing the inner support element 620 to slide relative to outer support element 610 as shown in FIG. 8 (the V-clamp is omitted in FIG. 8 for clarity but would be as shown in FIG. 9B when fully opened).

Figure 10:
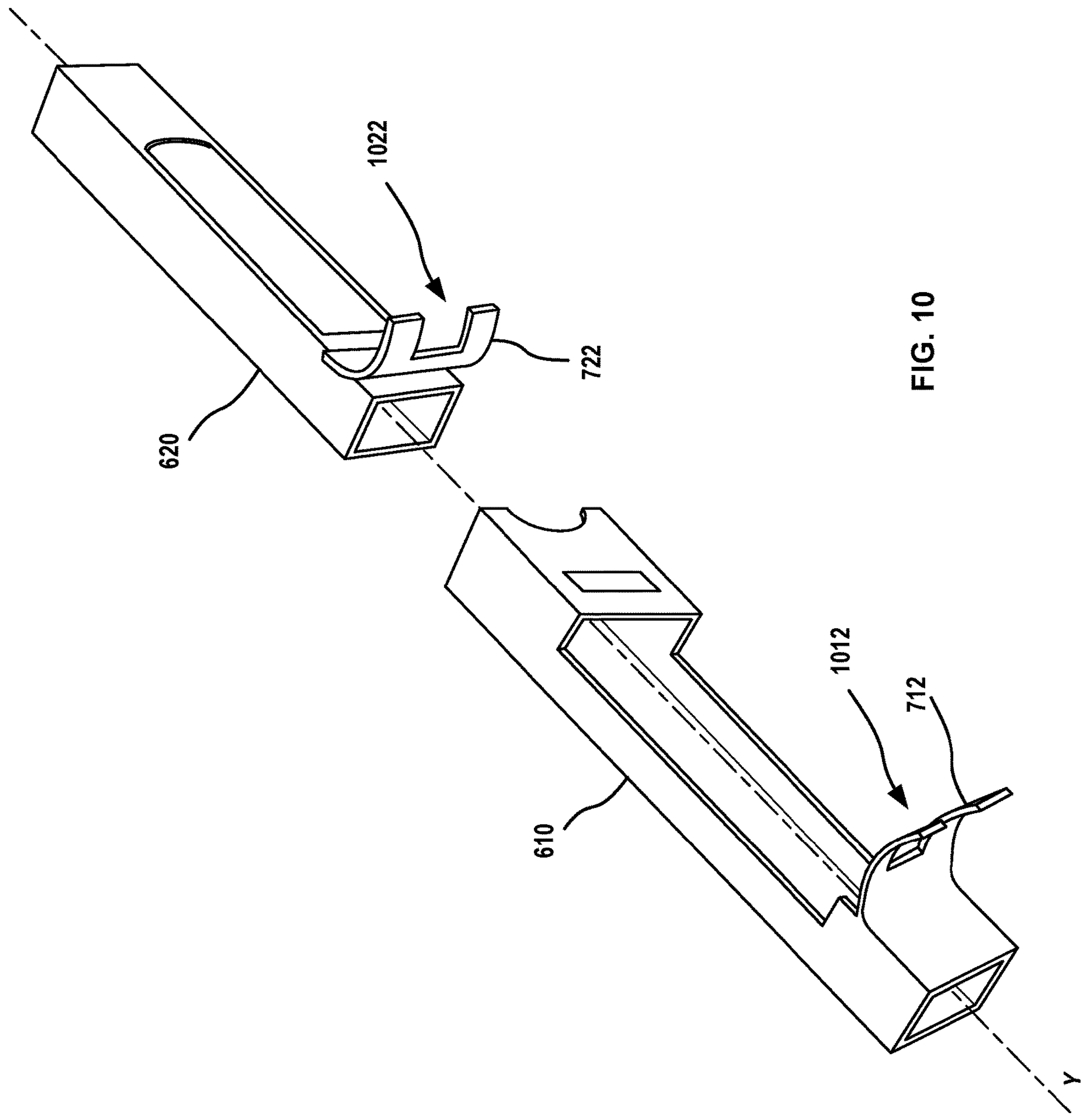
FIG. 10 is an illustration of additional details of the spreader mechanism embodiment of FIG. 5, 6A, and 6B showing how the inner support element slides axially within the outer support element along axis Y.

FIG. 10 illustrates additional details of the spreader element embodiment 510, showing how inner support element 620 slides longitudinally along axis Y within outer support element 610. As noted previously, the outer tube or sheath of actuator cable 520 may be mechanically fixed to the outer support element 610 such as shown in FIGS. 7A, 7B, 11, and 12, and the inner cable of actuator cable 520 may be mechanically fixed to the inner support element 620 as likewise shown in FIGS. 7A, 7B, 11, and 12. As shown in FIG. 10, in an exemplary embodiment the hooks 712 and 712 may include slots 1012 and 1022 or other openings in the hooks to allow the bolt 170 to be positioned within the hooks to better engage the hooks with corresponding brackets 140 and 150.

Turning to FIG. 11 and FIG. 12, additional details of the spreader mechanism embodiment 510 are shown. FIG. 11 shows the spreader mechanism embodiment 510 in a released position, with an outer tube 754 ferrule754 of actuator cable 520 attached at point 1125 to the outer support element 610. A return spring may be positioned over the distal end of the actuator cable 520, such as spring 1110 shown in FIG. 11 and FIG. 12, to force the spreader to return to a released position when the pliers' handles are released. The return spring may be placed in other positions in alternate embodiment to force the spreader to the released position and/or, in some embodiments, to a closed position. The inner cable 752 of actuator cable 520 may be attached at point 1135 to the inner support element 620 as shown in FIG. 11.

FIG. 13 and FIG. 14 illustrate details of a plier element embodiment 530 and connection of the plier element 530 to the actuator cable 520. As noted previously, in an exemplary embodiment plier 530 may be a Snap On model SHCP1A plier.

Plier element 530 may include two handles 1312 and 1322. In the open pliers position the handles 1322 and 1312 are separated as shown in FIG. 13, which may correspondingly place the spreader element 510 in a released position such as shown in FIG. 6B with the spreader hooks 712 and 722 close together, placing an associated V-clamp into the position shown in FIG. 6B. Conversely, when the handles 1312 and 1322 of pliers element 530 are squeezed together by a user, such as shown in FIG. 14, the spreader hooks are spread apart such as shown in FIG. 6A. The pliers may include a locking mechanism to retain the pliers in the squeezed position shown in FIG. 14 so as to allow a user to position the V-clamp over a pipe joint and allow the user to position the pipe ends together and place the V-clamp over the joint without the need to hold the V-clamp in the open position. Once everything is lined up, the user then releases the pliers from the position shown in FIG. 14, and the V-clamp may then return to the released position (e.g. as shown in FIG. 6B) so that the user may then tighten the clamp into place over the pipe joint. The pliers may include various elements such as, for example, locking mechanism 1332, spring 1322, pivot pin 1324, and two jaws with grip elements 1324 and 1314. As shown in FIG. 13 and FIG. 14, the outer tube 752 of actuator cable 752 may be retained in place relative to or mechanically fixed to grip element 1324 and the inner cable 754 may be retained by or mechanically fixed to grip element 1314. A pin 1355, ferrule, or other termination may be fixed to the distal end of inner cable 754 to engage the inner cable with grip element 1314.

The scope of the present invention is not intended to be limited solely to the aspects shown herein, but are to be accorded the full scope consistent with the description and drawings and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the presently claimed invention is not intended to be limited solely to the aspects described herein but is to be accorded the widest scope consistent with the appended claims and their equivalents.

I claim:

1. A V-clamp installation/removal tool, comprising:

a spreader mechanism, including:

an elongate hollow outer tubular support element having a proximal end and a distal end, the hollow outer support element defining an interior volume;

a first spreader hook, having a first curved portion with a first slot to receive a corresponding curved surface of an upper bar curved section 143 of a V-clamp, welded to the outer support element substantially at the proximal end of the outer support element and positioned normal to a surface of the outer support element so as to form a right angle with the surface of the outer support element;

an elongate inner tubular support element having a proximal and a distal end, the inner support element slidably positioned at least partially within the interior volume;

a second spreader hook, having a second outward curved portion with a second slot to receive a corresponding curved surface of an upper bar curved section 153 of a V-clamp, welded to the inner support element substantially at the proximal end of the inner support element and positioned normal to a surface of the inner support element so as to form a right angle with the surface of the inner support element; and a spring positioned between the outer support element and the inner support element within the interior volume;

an actuator cable having a tubular outer element and an inner cable slidable within the tubular outer clement; and a plier element having a first handle mechanically fixed to a first jaw and first gripping clement and a second handle mechanically fixed to a second jaw and second gripping clement with the first handle and second handle pivotably coupled;

wherein the distal end of the actuator cable outer element is mechanically coupled to the outer support clement and the actuator cable inner cable is mechanically coupled to the inner support clement; and wherein the proximal end of the actuator cable outer element is mechanically coupled to one of the gripping elements and the proximal end of the actuator cable inner cable is mechanically coupled to the other gripping element.

2. The tool of claim 1, wherein the hollow outer support element comprises a tubular section defining the interior volume.

3. The tool of claim 2, wherein the hollow outer support element tubular section comprises a tube having a rectangular cross-sectional shape.

4. The tool of claim 2, wherein the hollow outer support element tubular section comprises a tube having a round cross-sectional shape.

5. The tool of claim 1, wherein the outer tubular element comprises a plastic material and the inner cable comprises a metallic wire.

6. The tool of claim 1, wherein the first and/or second spreader hooks include slots to position the hooks about a V-clamp bolt.

7. The spreader mechanism of claim 1, wherein the spreader hooks' curved portions to receive a corresponding curved surface of upper bar curved sections of V-clamps each include slots to position the first spreader hook and the second spreader hook about a V-clamp bolt, with the V-clamp bolt at least partially within the slot.

8. The spreader mechanism of claim 7, wherein the slots are rectangular shaped slots.

9. The spreader mechanism of claim 7, wherein one end of the curved portion of the first spreader hook to receive the corresponding curved surface of an upper bar curved section 143 of a V-clamp is curved outward towards the proximal end of the outer support element.

10. . . . The spreader mechanism of claim 9, wherein one end of the curved portion of the second spreader hook to receive the corresponding curved surface of an upper bar curved section 153 of a V-clamp is curved inward towards the distal end of the inner support element.

11. The spreader of claim 1, wherein the first spreader hook curved portion is cut and formed outward from the elongate hollow outer support element towards the distal end.

12. The tool of claim 1, wherein the first outward curved portion have a portion that is substantially circular shaped.

13. The tool of claim 1, wherein the first outward curved portion curves inward from the proximal end of the outer support element.

14. The tool of claim 1, wherein the second outward curved portion curves inward from the proximal end of the inner support element.

15. The tool of claim 14, wherein the first outward curved portion curves inward from the proximal end of the outer support element.

16. The tool of claim 1, wherein the actuator cable tubular outer element is mechanically coupled to the elongate hollow outer tubular support element and the actuator cable inner cable is mechanically coupled to the elongate inner tubular support element.

17. A spreader mechanism for use in a V-clamp installation tool, comprising:

an elongate hollow outer tubular support element having a proximal end and a distal end, the hollow outer support element defining an interior volume;

a first spreader hook, having a first outward curved portion with a first slot to receive a corresponding curved surface of an upper bar curved section 143 of a V-clamp, welded to the outer support element substantially at the proximal end of the outer support element and positioned normal to a surface of the outer support element so as to form a right angle with the surface of the outer support element;

an elongate inner support element having a proximal and a distal end, the inner support element slidably positioned at least partially within the interior volume;

a second spreader hook, having a second outward curved portion with a second slot to receive a corresponding curved surface of an upper bar curved section 153 of a V-clamp, coupled to the inner support element substantially at the proximal end of the inner support element and positioned normal to a surface of the inner support element so as to form a right angle with the surface of the inner support element; and a spring positioned between the outer support element and the inner support element within the interior volume.

18. The spreader mechanism of claim 17, wherein the hollow outer support element comprises a tubular section defining the interior volume.

19. The spreader mechanism of claim 18, wherein the hollow outer support element tubular section comprises a tube having a rectangular cross-sectional shape.

20. The spreader mechanism of claim 18, wherein the hollow outer support element tubular section comprises a tube having a round cross-sectional shape.

21. The spreader mechanism of claim 17, wherein the inner support element comprises a hollow tubular section.

22. The spreader mechanism of claim 17, wherein the inner support element comprises a solid tubular section.

23. The spreader mechanism of claim 21 or 22, wherein the inner support element comprises a tube having a rectangular cross-sectional shape.

24. The spreader mechanism of claim 21 or 22, wherein the inner support element comprises a tube having a round cross-sectional shape.

25. The spreader mechanism of claim 17, wherein the first and/or second spreader hooks have a hook portion with a substantially circular cross-sectional shape.

26. The spreader mechanism of claim 17, wherein the first and/or second spreader hooks include slots to position the hooks about a V-clamp bolt.

* * * * *